(12) United States Patent
Smus et al.

(10) Patent No.: US 9,390,726 B1
(45) Date of Patent: Jul. 12, 2016

(54) SUPPLEMENTING SPEECH COMMANDS WITH GESTURES

(71) Applicant: Google Inc., Mountain View, CA (US)

(72) Inventors: Boris Smus, San Francisco, CA (US); Alejandro Jose Kauffmann, San Francisco, CA (US); Christian Plagemann, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 383 days.

(21) Appl. No.: 14/142,973

(22) Filed: Dec. 30, 2013

(51) Int. Cl.
*G10L 15/22* (2006.01)
*G10L 21/06* (2013.01)
*G06F 3/16* (2006.01)
*G06F 3/01* (2006.01)

(52) U.S. Cl.
CPC .............. *G10L 21/06* (2013.01); *G10L 15/22* (2013.01); *G06F 3/017* (2013.01); *G06F 3/167* (2013.01)

(58) Field of Classification Search
CPC .......... G10L 15/22; G06F 3/017; G06F 3/167
See application file for complete search history.

(56) References Cited

U.S. PATENT DOCUMENTS

| | | |
|---|---|---|
| 6,526,395 B1 | 2/2003 | Morris |
| 8,255,836 B1 | 8/2012 | Gildfind |
| 8,259,163 B2 | 9/2012 | Bell |
| 8,354,997 B2 | 1/2013 | Boillot |
| 8,373,673 B2 | 2/2013 | Shiplacoff et al. |
| 8,380,225 B2 | 2/2013 | Cheng et al. |
| 8,560,976 B1 | 10/2013 | Kim |
| 2005/0283364 A1* | 12/2005 | Longe ................ G06K 9/00422 704/257 |
| 2006/0101354 A1 | 5/2006 | Hashimoto et al. |
| 2008/0141181 A1 | 6/2008 | Ishigaki et al. |
| 2008/0263479 A1 | 10/2008 | Bloem et al. |
| 2010/0031202 A1 | 2/2010 | Morris et al. |
| 2010/0241431 A1* | 9/2010 | Weng ....................... G06F 3/038 704/257 |
| 2011/0043602 A1 | 2/2011 | Lee |
| 2011/0117535 A1 | 5/2011 | Benko et al. |
| 2011/0185309 A1 | 7/2011 | Challinor et al. |
| 2011/0193939 A1 | 8/2011 | Vassigh et al. |
| 2011/0289455 A1 | 11/2011 | Reville et al. |
| 2012/0001875 A1 | 1/2012 | Li et al. |
| 2012/0035932 A1* | 2/2012 | Jitkoff ................ G01C 21/3608 704/254 |
| 2012/0131518 A1 | 5/2012 | Lee et al. |
| 2012/0139907 A1 | 6/2012 | Lee et al. |
| 2012/0163625 A1 | 6/2012 | Siotis et al. |
| 2012/0192108 A1 | 7/2012 | Kolb |
| 2012/0324368 A1 | 12/2012 | Putz et al. |
| 2012/0329529 A1 | 12/2012 | Van Der Raadt |

(Continued)

OTHER PUBLICATIONS

Bolt, Richard A. "Put-that-there": Voice and gesture at the graphics interface. vol. 14. No. 3. ACM, 1980.*

(Continued)

*Primary Examiner* — Jialong He
(74) *Attorney, Agent, or Firm* — Fish & Richardson P.C.

(57) ABSTRACT

Described is a system and technique to supplement speech commands with gestures. A user interface may be improved by providing the ability for a user to intuitively provide speech commands with the aid of gestures. By providing gestures contemporaneously with a speech command, the user may delimit the commencement and end of a command thereby allowing the system to provide an immediate response. In addition, gestures may be detected in order to determine a source of a provided speech command, and accordingly, user specific actions may be performed based on the identity of the source.

38 Claims, 9 Drawing Sheets

(56) References Cited

U.S. PATENT DOCUMENTS

| | | |
|---|---|---|
| 2013/0055150 A1 | 2/2013 | Galor |
| 2013/0083252 A1 | 4/2013 | Boyes |
| 2013/0120243 A1 | 5/2013 | Kim et al. |
| 2013/0144629 A1 | 6/2013 | Johnston et al. |
| 2013/0227418 A1 | 8/2013 | Sa et al. |
| 2013/0229345 A1 | 9/2013 | Day et al. |
| 2013/0257748 A1 | 10/2013 | Ambrus et al. |
| 2013/0326431 A1 | 12/2013 | Björklund et al. |
| 2014/0006944 A1 | 1/2014 | Selig et al. |
| 2014/0007022 A1 | 1/2014 | Tocino Diaz et al. |
| 2014/0207446 A1 | 7/2014 | Klein et al. |
| 2014/0214415 A1 | 7/2014 | Klein |

OTHER PUBLICATIONS

MarksThinkTank, "Wave control", Google Scholar, Android App, Jan. 31, 2013.

Von Hardenberg et al., "Bare-Hand Human-Computer Interaction", Proceedings of the ACM Workshop on Perceptive User Interfaces, pp. 1-8, Nov. 2001.

\* cited by examiner

SUPPLEMENTING SPEECH COMMANDS WITH GESTURES

BACKGROUND

Computer systems employ various techniques in order to provide improved user interfaces. One such technique is the ability to receive various forms of input in addition to physical inputs such as those from a controller, keyboard, and/or mouse. For example, a system may have the ability to receive a voice-based input. These systems, however, often require the user to say specific keywords and commands, which may not be intuitive when communicating with the system. Moreover, these systems may employ a delay before responding to a voice-based input in order to confirm that the user's intended command is completed. These delays, however, may be frustrating in instances where a user expects an immediate feedback. Accordingly, traditional voice-based input systems often provide an unsatisfying user experience.

BRIEF SUMMARY

In an implementation, described is a computer-implemented method for a device to interpret a voice-based input. The method may include detecting a presence of one or more users within a field-of-view of a capture device and receiving a speech command. The method may also include determining that a first user among the detected one or more users is a source of the received speech command based on detecting a first touchless gesture performed by the first user and determining one or more identities of the detected one or more users. In addition, the method may include disambiguating a word in the received speech command based on the determined one or more identities and performing an action based on the disambiguated speech command.

In an implementation, described is a computer-implemented method for a device to interpret a voice-based input. The method may include determining one or more identities of one or more users within a field-of-view of a capture device and receiving a speech command. The method may also include disambiguating a word in the received speech command based on the determined one or more identities and performing an action based on the disambiguated speech command.

In an implementation, described is a device for interpreting a voice-based input. The device may be in communication with a microphone and a capture device and may include a processor. The processor may be configured to detect a presence of one or more users within a field-of-view of the capture device and receive, via the microphone, a speech command. The processor may also be configured to determine that a first user among the detected one or more users is a source of the received speech command based on detecting a first touchless gesture performed by the first user and determine one or more identities of the detected one or more users. In addition, the processor may be configured to disambiguate a word in the received speech command based on the determined one or more identities and perform an action based on the disambiguated speech command.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Described is a system and technique to supplement speech commands with gestures. The present disclosure improves a user interface by allowing the user to intuitively provide speech commands with the aid of gestures. By providing gestures contemporaneously with a speech command, the user may delimit the commencement and end of a command thereby allowing the system to provide an immediate response. In addition, gestures may be detected in order to determine a source of a provided speech command, and accordingly, user-specific actions may be performed based on the identity of the source. By identifying the source of the speech command, the system may disambiguate one or more words of the speech command. For example, in response to receiving the speech command "open my calendar," the system may disambiguate the word "my" based on the identity of the source of the command in order to open the appropriate calendar. In addition, the system may also disambiguate other personal pronouns of a speech command. For example, a user may provide a speech command and a gesture pointing to another user. For instance, the system may disambiguate commands such as "him" or "her" by determining the user corresponding to "him" or "her" based on identifying the user that is referenced. Accordingly, the systems and techniques described herein provide an improved user experience by allowing the user to communicate using natural language techniques.

Figure 1:
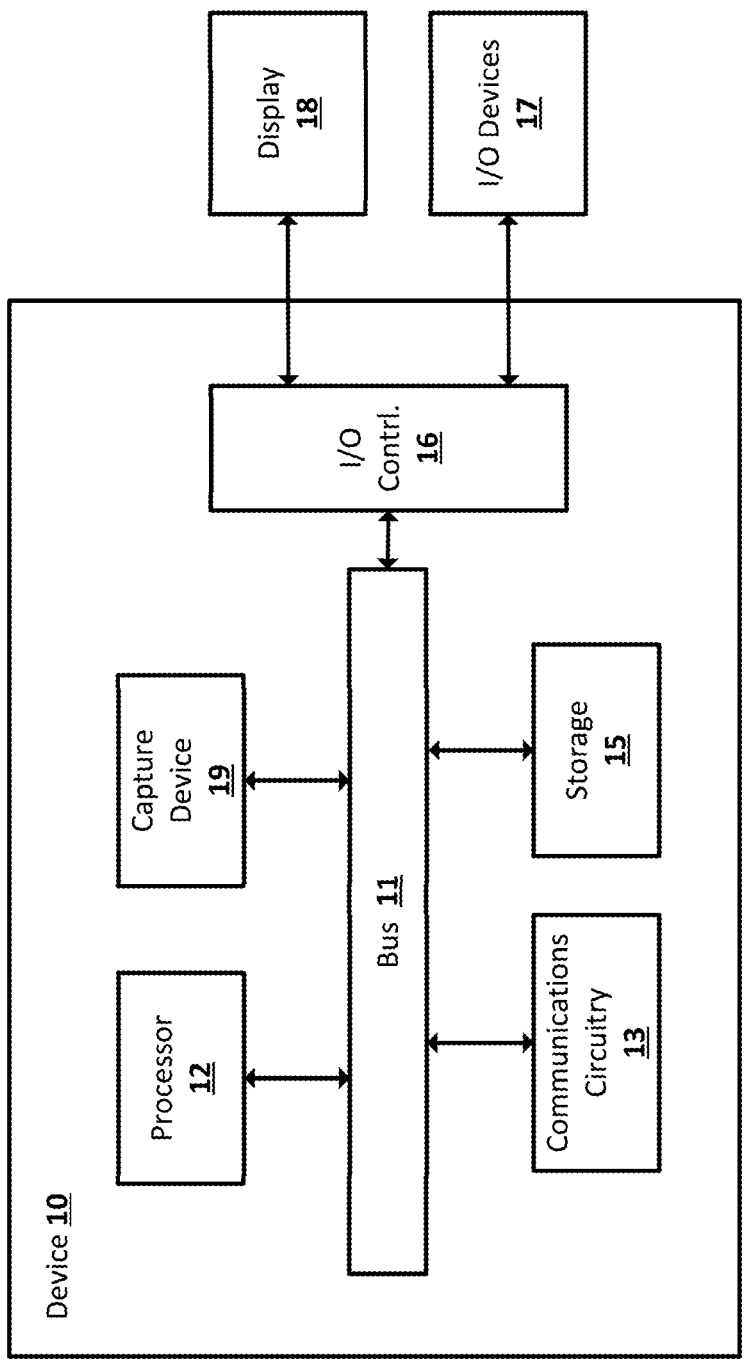
FIG. 1 shows a functional block diagram of a representative device according to an implementation of the disclosed subject matter.

FIG. 1 shows a functional block diagram of a representative device according to an implementation of the disclosed subject matter. The device 10 may include a bus 11, processor 12, memory 14, I/O controller 16, communications circuitry 13, storage 15, and a capture device 19. The device 10 may also include or may be coupled to a display 18 and one or more I/O devices 17."

The device 10 may include or be part of a variety of types of devices, such as a set-top box, game console, television, media player, mobile phone (including a "smartphone"), computer (including tablets, laptops, etc.), or other type of device. The processor 12 may be any suitable programmable control device and may control the operation of one or more processes, such as speech and gesture recognition as discussed herein, as well as other processes performed by the device 10. As described herein, actions may be performed by a computing device, which may refer to a device (e.g. device 10) and/or one or more processors (e.g. processor 12). The bus 11 may provide a data transfer path for transferring between components of the device 10.

The communications circuitry 13 may include circuitry for wired or wireless communications for short-range and/or long range communication. For example, the wireless communication circuitry may include Wi-Fi enabling circuitry for one of the 802.11 standards, and circuitry for other wireless network protocols including Bluetooth, the Global System for Mobile Communications (GSM), and code division multiple access (CDMA) based wireless protocols. Communications circuitry 13 may also include circuitry that enables the device 10 to be electrically coupled to another device (e.g. a computer or an accessory device) and communicate with that other device. For example, a user input component such as a wearable device may communicate with the device 10 through the communication circuitry 13 using a short-range communication technique such as infrared (IR) or other suitable technique.

The storage 15 may store software (e.g., for implementing various functions on device 10), and any other suitable data. The storage 15 may include memory such as read-only memory (ROM), electrically erasable programmable read-only memory (EEPROM), flash memory, random access memory (RAM), and the like. The storage 15 may also include various forms of non-volatile memory such as a hard-drive, solid state drive, flash drive, and the like. The storage 15 may be integral with the device 10 or may be separate and accessed through an interface to receive a memory card, USB drive, optical disk, a magnetic storage medium, and the like.

An I/O controller 16 may allow connectivity to a display 18 and one or more I/O devices 17. The I/O controller 16 may include hardware and/or software for managing and processing various types of I/O devices 17. The I/O devices 17 may include various types of devices allowing a user to interact with the device 10. For example, the I/O devices 17 may include various input components such as a keyboard/keypad, controller (e.g. game controller, remote, etc.) including a smartphone that may act as a controller, touchscreen, and other components. The I/O devices 17 may include one or more microphones or another audio capture device to receive audio data such as spoken words from a user. For example, the device 10 may communicate with a microphone that is part of the device, or communicate (e.g. wirelessly) with one or more microphones that may be positioned at various locations of a room. The I/O devices 17 may also include components for aiding in the detection of gestures including wearable components such as a watch, ring, or other components that may be used to track body movements (e.g. including holding a smartphone to detect movements).

Figure 3:
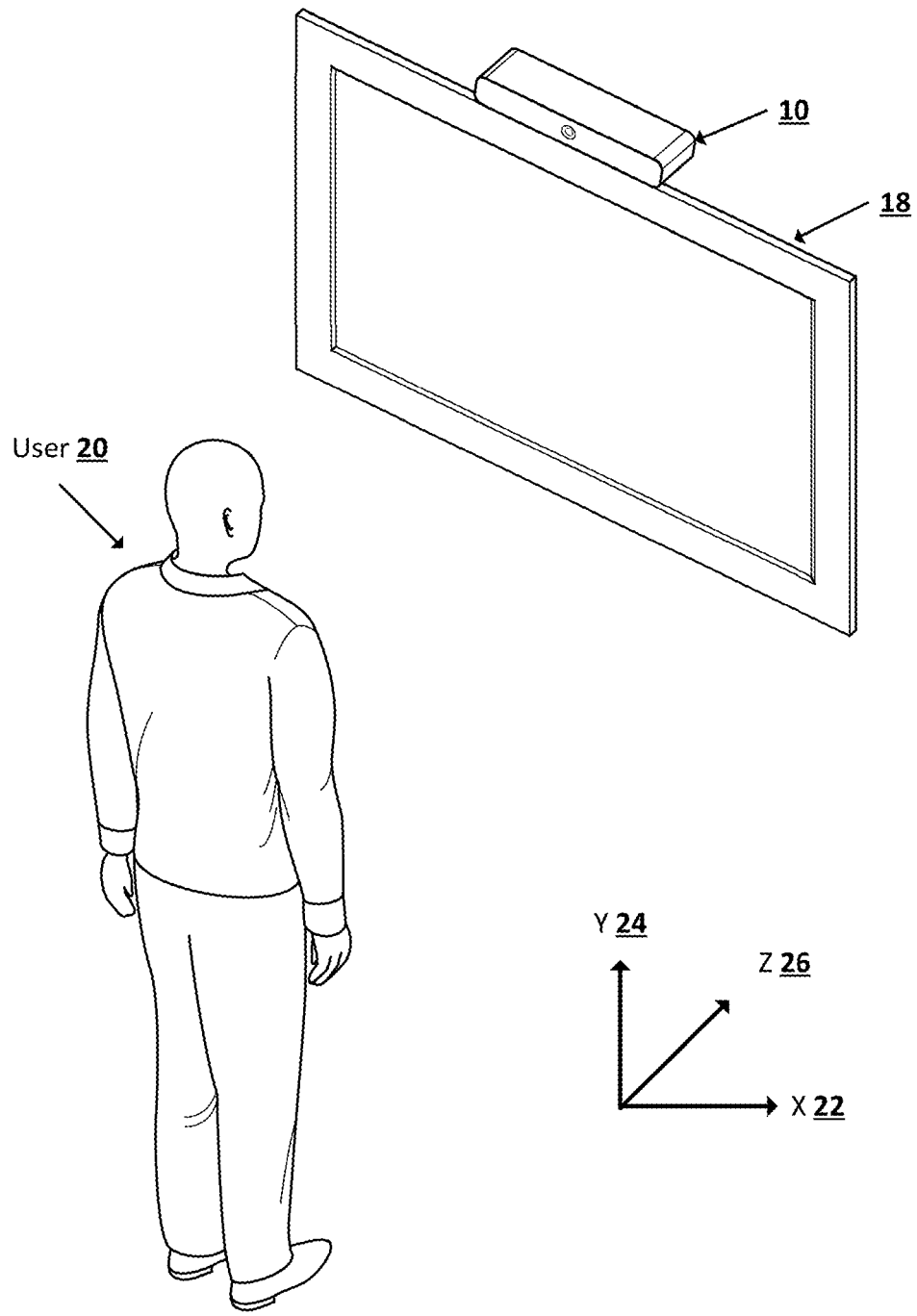
FIG. 3 shows an example arrangement of a user interacting with a device according to an implementation of the disclosed subject matter.

The device 10 may act a standalone unit that is coupled to a separate display 18 (as shown in FIGS. 1 and 3), or the device 10 may be integrated with or be part of a display 18 (e.g. integrated into a television unit). When acting as standalone unit, the device 10 may be coupled to a display 18 through a suitable data connection such as an HDMI connection, a network type connection, or a wireless connection. The display 18 may be any a suitable component for providing visual output as a display screen such as a television, computer screen, projector, and the like.

Figure 2:
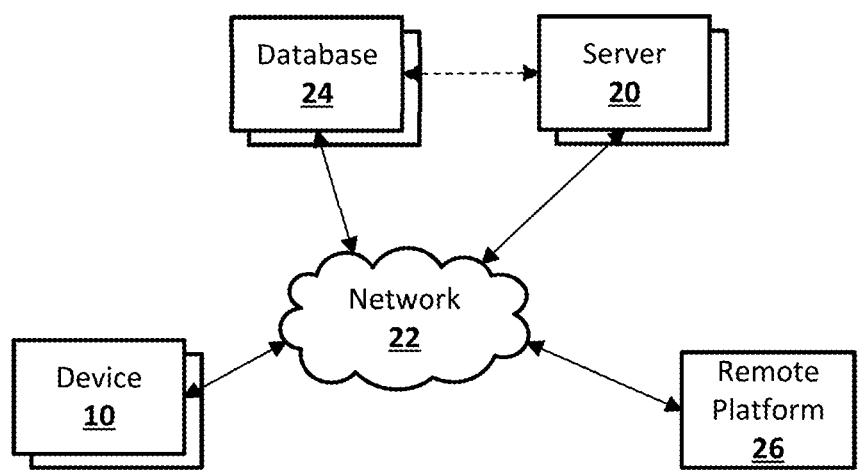
FIG. 2 shows a network arrangement according to an implementation of the disclosed subject matter.

The device 10 may include a capture device 19 (as shown in FIGS. 1 and 2), or the device 10 may be operatively coupled to the capture device 19 through the I/O controller 16 as an I/O device 17 described above. In one example, the device 10 may include a remote device (e.g. server) that receives data from a capture device 19 (e.g. webcam or similar component) that is local to the user. The capture device 19 may include one or more cameras for capturing an image or series of images continuously, periodically, at select times, and/or under select conditions. The capture device 19 may be used to visually monitor one or more users such that gestures and/or movements performed by the one or more users may be captured, analyzed, and tracked to detect gesture movements as described further herein.

The capture device 19 may be configured to capture depth information including a depth image using techniques such as time-of-flight, structured light, stereo image, or other suitable techniques. The depth image may include a two-dimensional pixel area of the captured image where each pixel in the two-dimensional area may represent a depth value such as a distance. The capture device 19 may include two or more physically separated cameras that may view a scene from different angles to obtain visual stereo data to generate depth information. Other techniques of depth imaging may also be used. The capture device 19 may also include additional components for capturing depth information of an environment such as an IR light component, a three-dimensional camera, and a visual image camera (e.g. RGB camera). For example, with time-of-flight analysis the IR light component may emit an infrared light onto the scene and may then use sensors to detect the backscattered light from the surface of one or more targets (e.g. users) in the scene using a three-dimensional camera or RGB camera. In some instances, pulsed infrared light may be used such that the time between an outgoing light pulse and a corresponding incoming light pulse may be measured and used to determine a physical distance from the capture device 19 to a particular location on a target.

FIG. 2 shows an example network arrangement according to an implementation of the disclosed subject matter. A device 10 may communicate with other devices 10, a server 20, and a database 24 via the network 22. The network 22 may be a local network, wide-area network (including the Internet), and other suitable communications network. The network 22 may be implemented on any suitable platform including wired and wireless technologies. Server 20 may be directly accessible a device 10, or one or more other devices 10 may provide intermediary access to a server 20. The device 10 and server 20 may access a remote platform 26 such as cloud computing arrangement or service. The remote platform 26 may include one or more servers 20 and databases 24. The term server may be used herein and may include a single server or one or more servers.

FIG. 3 shows an example arrangement of a user interacting with a device according to an implementation of the disclosed subject matter. A device 10 that is coupled to a display 18 may capture gesture movements from a user 20. The display 18 may include an interface that allows a user to interact with the display 18 or additional components coupled to the device 10. The user 20 may interact with the device 10 by providing various speech commands and/or performing various gestures. As described further herein, gestures may supplement a speech command (or vice versa).

When interacting with the device 10, the device may perform gesture detection which may be based on measuring and recognizing various body movements of the user 20. Typically, the gesture may include a hand movement, but other forms of gestures may also be recognized. For example, a gesture may include movements from a user's arms, legs, feet, and other movements such as body positioning or other types of identifiable movements from a user. These identifiable movements may also include head movements including nodding, shaking, etc., as well as facial movements such as eye tracking, and/or blinking. Gestures may include "in-air" type gestures that may be performed within a three-dimensional environment. In addition, these in-air gestures may include "touchless" gestures that do not require inputs to a touch surface (e.g. touch sensitive display screen, touchpad, etc.).

Gesture detection may also be based on combinations of movements described above including being coupled with voice commands and/or other parameters. For example, a gesture may be identified based on a hand movement in combination with tracking the movement of the user's eyes, or a hand movement in coordination with a speech command. When performing gesture detection, specific gestures may be detected based on information defining a gesture, condition, or other information. For example, gestures may be recognized based on information such as a distance of movement (either absolute or relative to the size of the user), a threshold velocity of the movement, a confidence rating, and other criteria. The criteria for detecting a gesture may vary between applications and between contexts of a single application including variance over time.

As described, the gesture may include movements within a three-dimensional environment, and accordingly, the gestures may include components of movement along one or more axes. These axes may be described as including an X-axis 22, Y-axis 24, and Z-axis 26. These axes may be defined based on a the typical arrangement of a user facing a capture device 19, which is aligned with the display 18 as shown in FIG. 2. The X-axis 22 may include movements parallel to the display 18 and perpendicular to the torso of the user 20. For example, left or right type movements such as a swiping motion may be along the X-axis 22. The Y-axis 24 may include movement parallel to the display 18 and parallel to the torso of the user 20. For example, up and down type movements such as a raise or lower/drop motion may be along the Y-axis 24. The Z-axis may include movement perpendicular to the display 18 and perpendicular to the torso of the user 20. For example, forward and back type movements such as a push or pull motion may be along the Z-axis 26. Movements may be detected based on movements substantially along one or more of these axes including combinations of movements or components of a movement along a single axis depending on a particular context.

Figure 4:
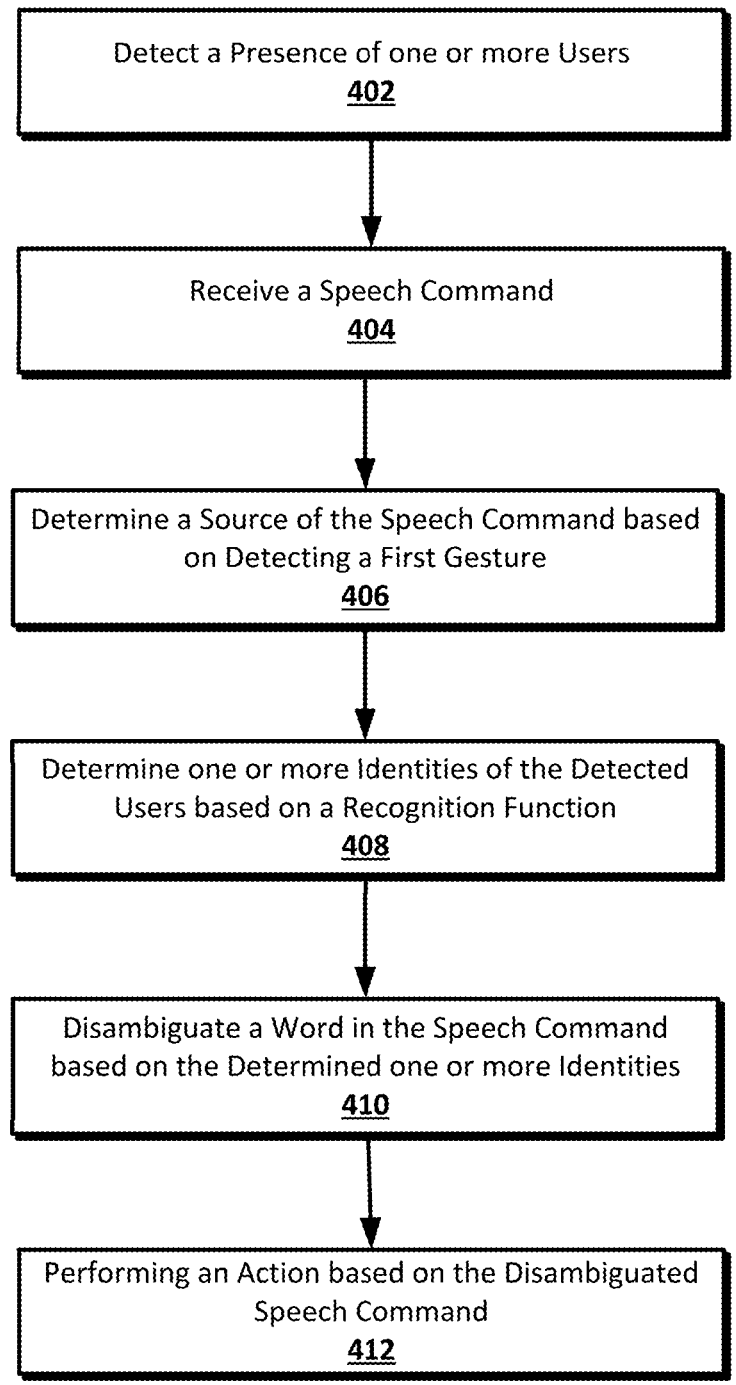
FIG. 4 shows a flow diagram of a device interpreting a voice-based input according to an implementation of the disclosed subject matter.

FIG. 4 shows a flow diagram of a device interpreting a voice-based input according to an implementation of the disclosed subject matter. In 402, the device may detect a presence of one or more users. Detecting may include the device performing the actual detection and/or the device receiving and indication that one or more users have been detected by the capture device. This may include determining whether one or more users are within a field-of-view of a capture device (e.g. capture device 19) and/or whether one or more users are within a general vicinity of the device (e.g. present within a room). Users may interact with the device actively (e.g. provide a speech command) or may be passive participants in an interaction (e.g. referenced by a speech command). The device may detect a user (e.g. particular shapes that may correspond to a user) based on detecting motion (e.g. via a motion detector that may be part of or separate from the capture device), sound or a particular speech command, and/or another form of stimulus. In response to the detection of one or more users, the device may activate the capture device (if not already activated). For example, the device may detect the presence of a user based on a speech input, and in response, the device may activate the capture device. Upon a detection of one or more users, the device may initiate gesture detection. As described above, gesture detection may track a position of a user or particular features (e.g. hands, face, etc.), and may also determine the number of users within a field-of-view or vicinity, and/or other characteristics. A field-of-view as described herein may include an area perceptible by one or more capture devices (e.g. perceptible visual area). A vicinity as described herein may include the field-of-view plus an additional area in which the device may presume the user is located. For example, a user that was in the field-of-view and temporarily moves outside the field-of-view (e.g. moves to another area of the room) may still be determined to be within the vicinity based on characteristics such as a timing threshold, detected audio input (e.g. a particular voice or speech command), and/or other characteristics. In an implementation, the device may determine one or more identities (e.g. via a recognition technique) in response to detecting the presence of the one or more users. For example, the device may attempt to identify the one or more detected users within the field-of-view and remember (e.g. store) this information in order to interpret a subsequent speech command as described further herein. In another implementation, the device may attempt to identify the one or more detected users in response to receiving the speech command. For example, the device may perform a recognition function only after receiving a speech command that may need to be disambiguated.

In 404, the device may receive a speech command from a user. A speech command may include various forms of speech input and may be received via one or more microphones. A speech command may include any predefined "action" words and/or commands. The speech command may also include speech input for dictation purposes such as voice-to-text functions. In general, the device may be configured to interpret a speech command and responsively perform one or more actions. For example, the speech command may include "play video X," and in response, the device may initiate a playback of video X. When providing speech commands, the device may be configured to interpret natural forms of language. For example, a user may wish to communicate with the device in a natural manner and by using everyday words and phrases. For example, the use of nouns and pronouns is customary in typical natural language conversations. Pronouns are words that may be substituted for nouns in a sentence. As referred to herein, a personal pronoun may include the words as summarized below in Table 1.

TABLE 1

|  | Singular | | | Plural | | |
| --- | --- | --- | --- | --- | --- | --- |
|  | Subjective | Objective | Possessive | Subjective | Objective | Possessive |
| 1st Person | I | Me | My, Mine | We | Us | Our, Ours |
| 2nd Person | You | You | Your, Yours | You | You | Your, Yours |

TABLE 1-continued

|  | Singular | | | Plural | | |
| --- | --- | --- | --- | --- | --- | --- |
|  | Subjective | Objective | Possessive | Subjective | Objective | Possessive |
| 3rd Person | He, She, It | Him, Her, It | His, Hers, Its | They | Them | Their, Theirs |

As shown, the personal pronoun may include a first, second, or third person pronoun, which may be subjective, objective, or possessive. In addition, these pronouns may be singular or plural. For example, as referred to herein, a singular first-person possessive pronoun includes "my," or "mine."

Although personal pronouns are used in everyday speech, traditional speech-based command systems typically do not process these pronouns as they may be ambiguous in certain situations. For example, as described above, multiple users may be in the field-of-view of the capture device, and thus, a speech command of "open my calendar" may be ambiguous as it is not clear from the speech command alone, which of the user's calendar to open. In implementations as described further herein, these personal pronouns and other potentially ambiguous words may be disambiguated based on determining one or more user identities. More generally, a potentially ambiguous word as described herein may include any word or phrase in a speech command that may have one or more logical interpretations based on the use of the word in the command, and where it may not be possible to determine the intended interpretation without additional information such as a gesture. For example, in the command "load that file", the word "that" may be potentially ambiguous because it is not clear from the command itself which file is intended to be opened by the user. As another example, the phrase "first photo" in the command "open the first photo in the set" may be potentially ambiguous in the context of a photo editing program that has access to multiple sets of photographs, where the user has not otherwise selected one of the sets. Other examples of potentially ambiguous words are provided herein. Implementations of the presently disclosed subject matter allow for disambiguation of such words without additional input from the user such as by determining user identities, and/or in conjunction with gestures that the user may perform while giving the command. Accordingly, a user interacting with the device may provide speech commands in a more natural manner.

In 406, the device may determine that a first user among the detected one or more users is a source of the received speech command. By determining the source of the speech command, the device may determine additional contextual information in order to process the command. For example, as described above, multiple users may be within the field-of-view, and the device may determine a source of the speech command in order to disambiguate the speech command. This determination may be based on detecting that a first touchless gesture is performed by the first user. The performed gesture may include any detectable movement or a predefined input gesture. For example, the device may provide a gesture interface and predefined gesture inputs may initiate commands (e.g. "open," "play," "sleep," "share," etc.).

The detected gesture may be performed contemporaneously with the speech command. A contemporaneous gesture may include a gesture performed before, during, or after a speech command. A contemporaneous gesture performed before or after the speech command may be detected based on being performed within a predefined time threshold of the speech command. Such a threshold may be defined by a person of ordinary skill in the art such that the gesture may be presumed to be connected to the speech command and/or intended to provide context to the speech command. In addition, the detected gesture may provide parameters for a speech command such as delimiting parameters. For example, the gesture may include a predefined gesture that initiates a speech command.

Figure 5:
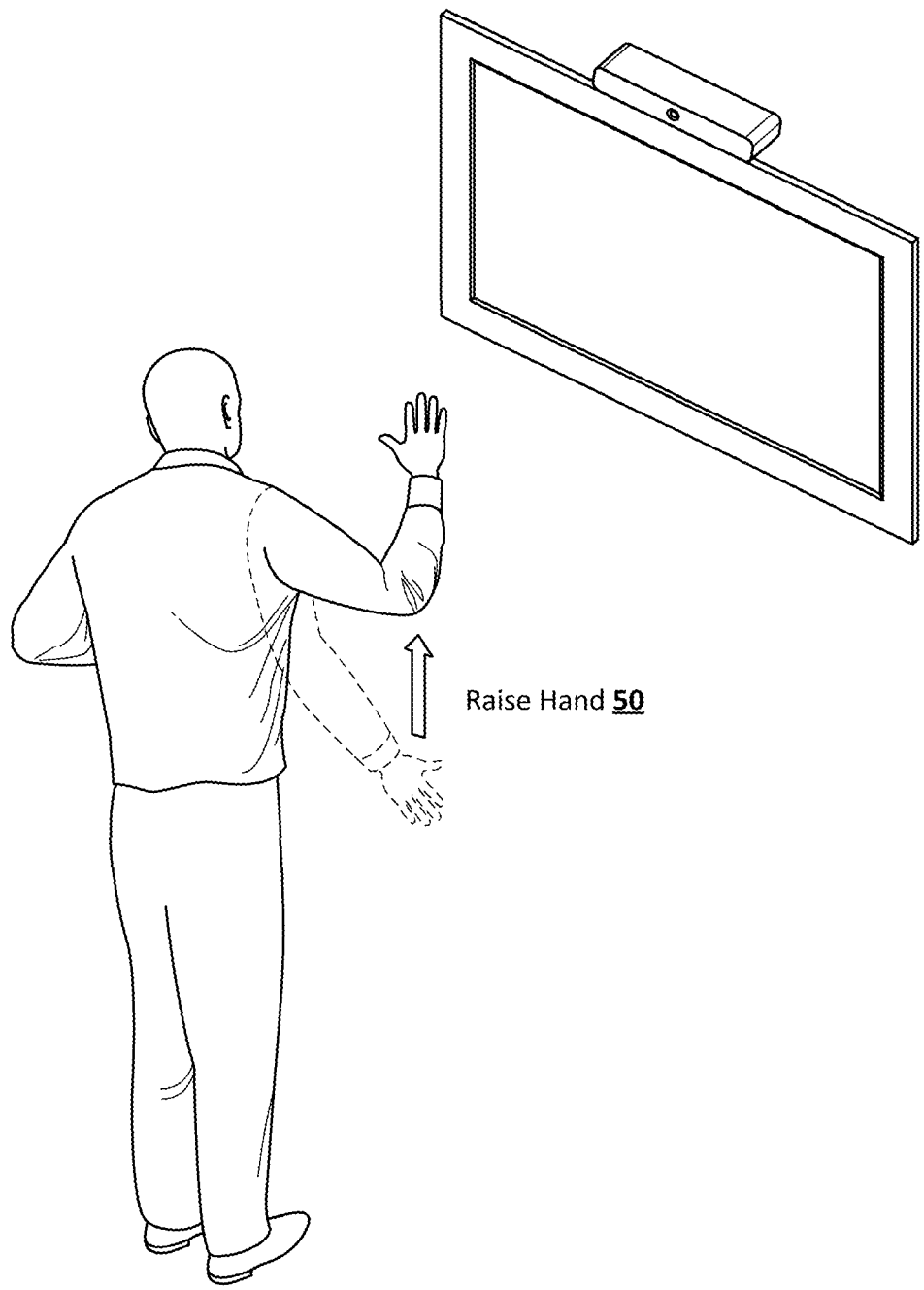
FIG. 5 shows an example of a gesture delimiting the commencement of a speech command according to an implementation of the disclosed subject matter.

FIG. 5 shows an example of a gesture delimiting the commencement of a speech command according to an implementation of the disclosed subject matter. As shown, a raise hand gesture 50 may provide an indication of the commencement of a speech command. Accordingly, the device may begin "listening" for a speech command upon detection of such a gesture. The gesture initiating a speech command may be in addition to, or used as an alternative to, the use of a particular "hot word" such as "start," "begin," "activate," etc. Instead of a raise hand gesture, other gestures may be performed such as a raise finger gesture, or other gestures to provide an indication to the device to commence "listening" for a speech command (e.g. process the audio input that may be received from a microphone). Similarly, a particular gesture may signal that the speech command is completed, and thus, provide an indication for the device to cease listening, or adjust the threshold at which the device recognizes a speech input (e.g. adjust a sensitivity of one or more microphones).

Figure 6:
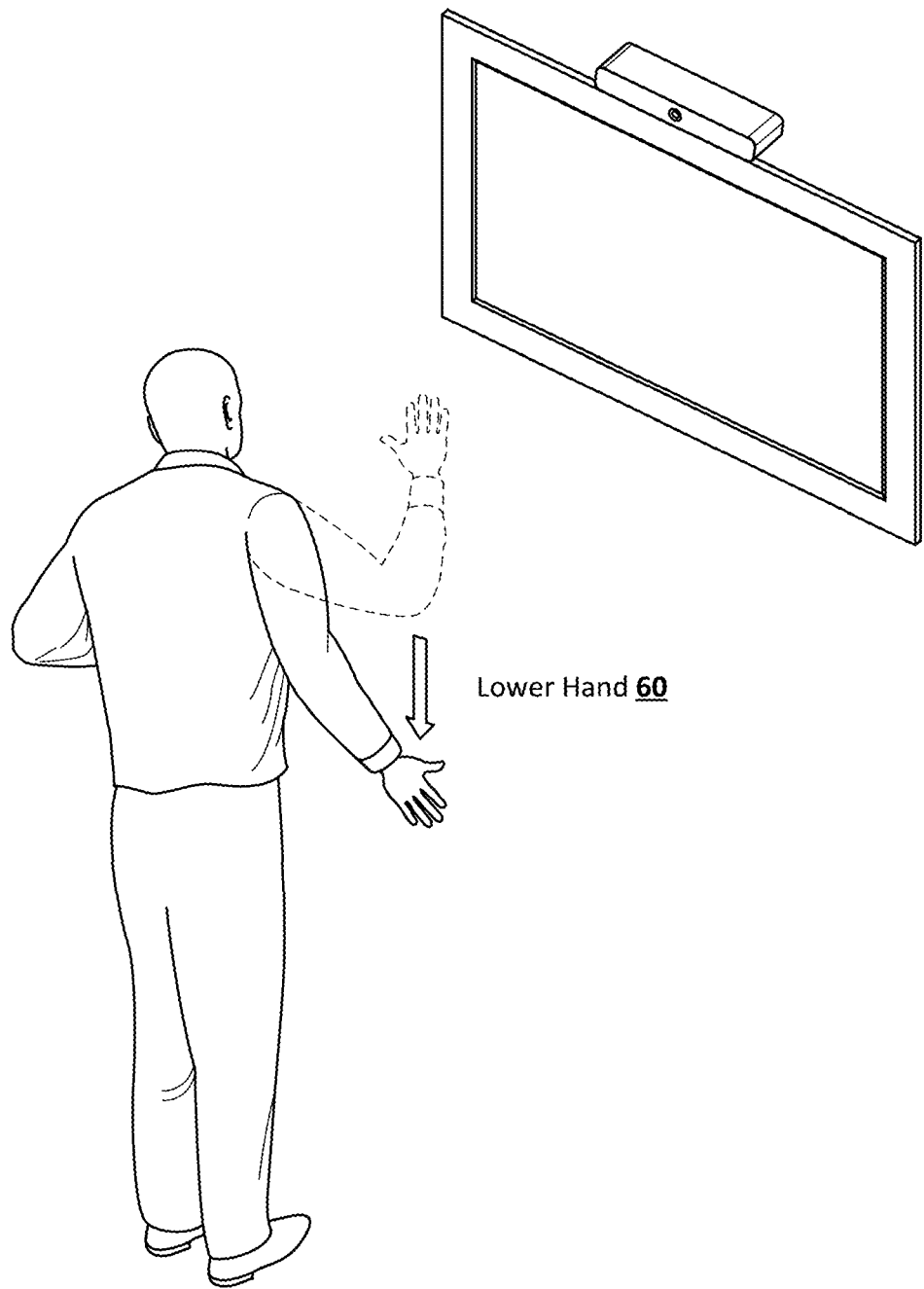
FIG. 6 shows an example of a gesture delimiting the end of a speech command according to an implementation of the disclosed subject matter.

FIG. 6 shows an example of a gesture delimiting the end of a speech command according to an implementation of the disclosed subject matter. As shown, a lower hand gesture 60 (or hand lowering, drop hand, etc.) may provide an indication of the end of a speech commend. Accordingly, the device is immediately aware of the end of a command, and thus, may stop "listening" for a speech command. As a result, the device may be able to respond immediately to the intended speech command. This provides an improvement over traditional voice-based systems, which are susceptible to a user experience drawback based on the speed at which these systems may respond to a speech input. For example, traditional systems often delay or determine that a speech input is complete only after a certain time has elapsed. For instance, a delay of even 1 to 2 seconds appears prolonged to a user that is accustomed to immediate feedback from physical input such as a mouse "click." Accordingly, implementations described herein may improve the overall user experience by providing an efficient technique to accelerate the process of interpreting speech commands.

In 408, the device may determine one or more identities of the detected one or more users by performing a recognition function. An identity of a user may include, for example, a user or a unique user account, both of which may be associated with user information. For example, this information may include a name, preferences, user history, demographic information, and other information that may be stored in association with a user account. As described above, a gesture may be detected and this gesture may also provide additional contextual information to identify a subject or an object that may be referenced in a speech command. In an implementation, the device may detect a referencing gesture supplementing a speech command (e.g. a gesture contemporaneous with a speech command). In an implementation, the device may detect a touchless gesture performed by a user that includes a pointing gesture to themselves, another user, or an object. For example, a user may point to a device while providing a command that may include potentially ambiguous terms such as a subject or object (including an indirect object) of a sentence. A subject or object of the sentence may include a pronoun or a name. In one example, the first user may point to a second user and provide a speech command such as "share this picture with him." In response, the device may determine the second user being referenced and may determine the identity of the second user by performing a recognition function. Alternatively, and as described above, identities of users may be determined before receiving the speech command. In such an instance, it may be determined which identity corresponds to the second user based on a position of the user (e.g. relative to the first user), or other suitable technique.

Figure 7:
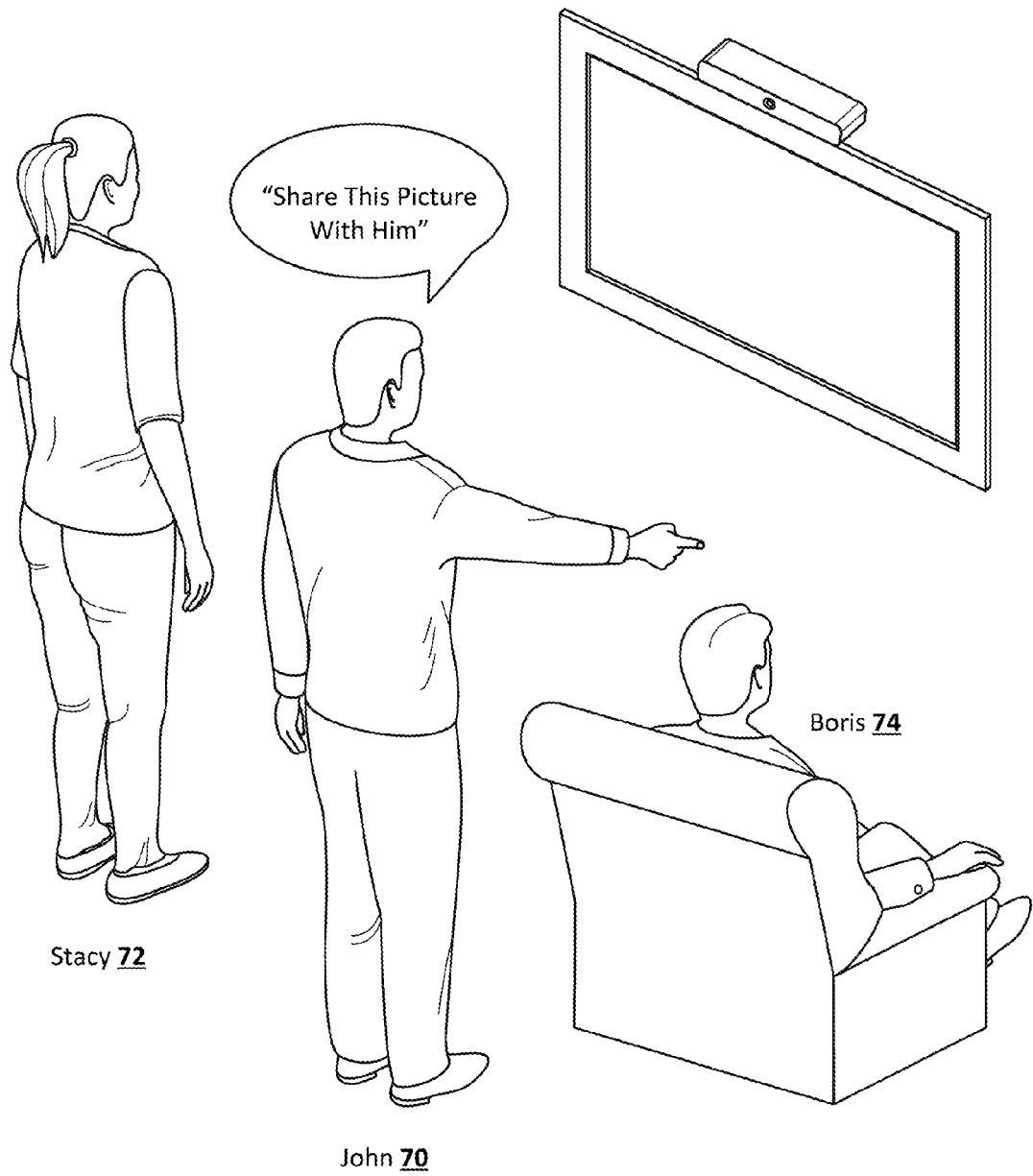
FIG. 7 shows an example of a user providing a speech command and a gesture referencing a user according to an implementation of the disclosed subject matter.

FIG. 7 shows an example of a user providing a speech command and a gesture referencing a user according to an implementation of the disclosed subject matter. As shown, the example in FIG. 7 includes three users John 70, Stacy 72, and Boris 74 within the field-of-view of the capture device. As shown, John 20 may provide a speech command and perform a pointing gesture referencing another user within a field-of-view of the capture device. The speech command may include a pronoun (e.g. "him"), and accordingly, the device may determine which user corresponds to "him," based on the pointing gesture, which in this example is Boris 74.

Figure 8:
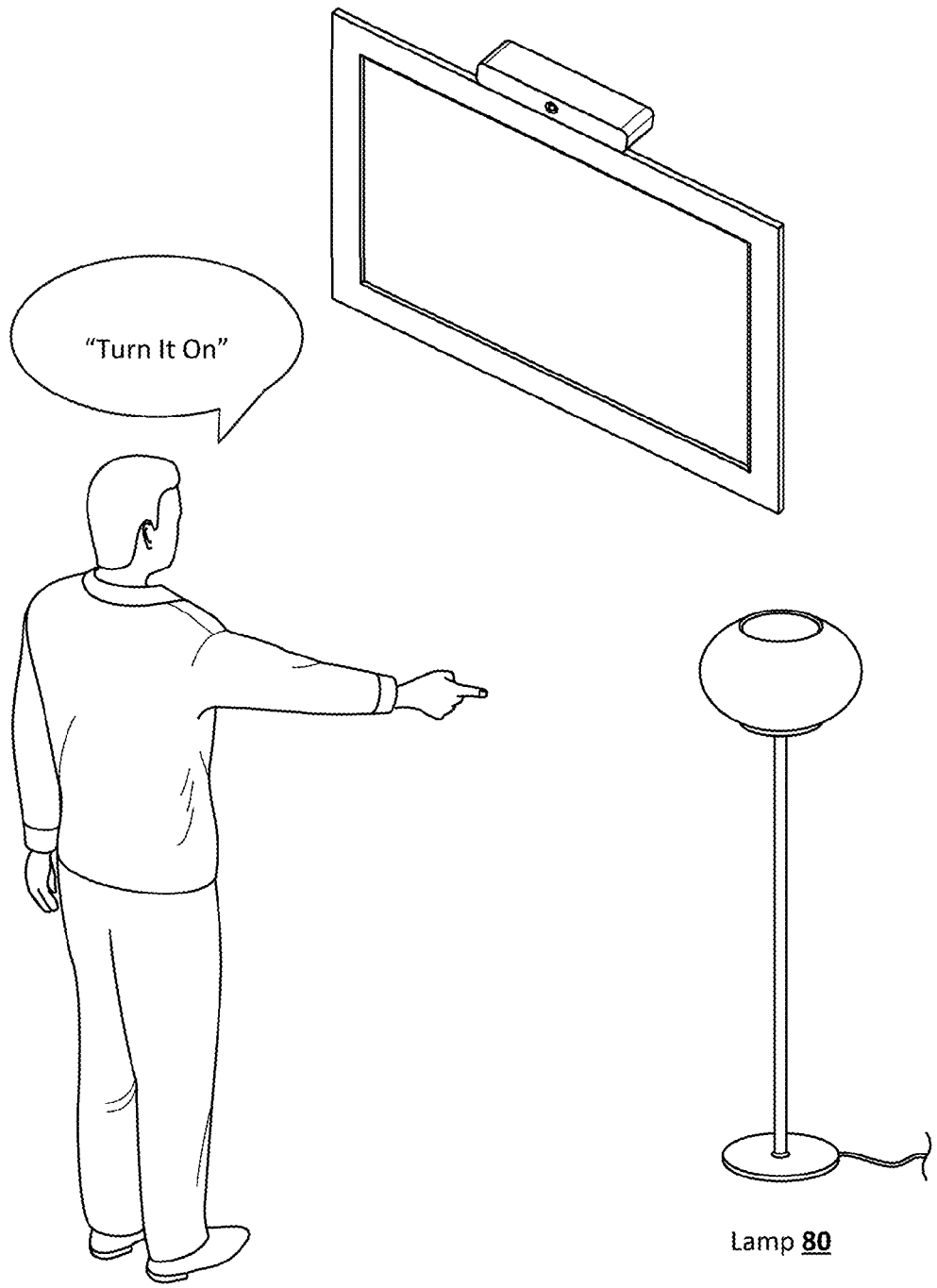
FIG. 8 shows an example of a user providing a speech command and a gesture referencing an object according to an implementation of the disclosed subject matter.

FIG. 8 shows an example of a user providing a speech command and a gesture referencing an object according to an implementation of the disclosed subject matter. As shown, a user may provide a speech command and contemporaneously point to an object. In an implementation, the device may identify the object and perform a corresponding action. The example in FIG. 8 includes an object, which in this case is a lamp 80. As shown, the user 20 may point to the lamp 80 and provide the speech command "turn it on." Accordingly, the device may send an instruction, through a network (e.g. wireless home network), for the lamp 80 to turn on. Speech commands may also include a subject of a sentence as the potentially ambiguous word. For example, the above example may be applicable for scenarios in which the command includes "this," that," "those," "these," etc. For example, the speech command may include "turn that on."

Figure 9:
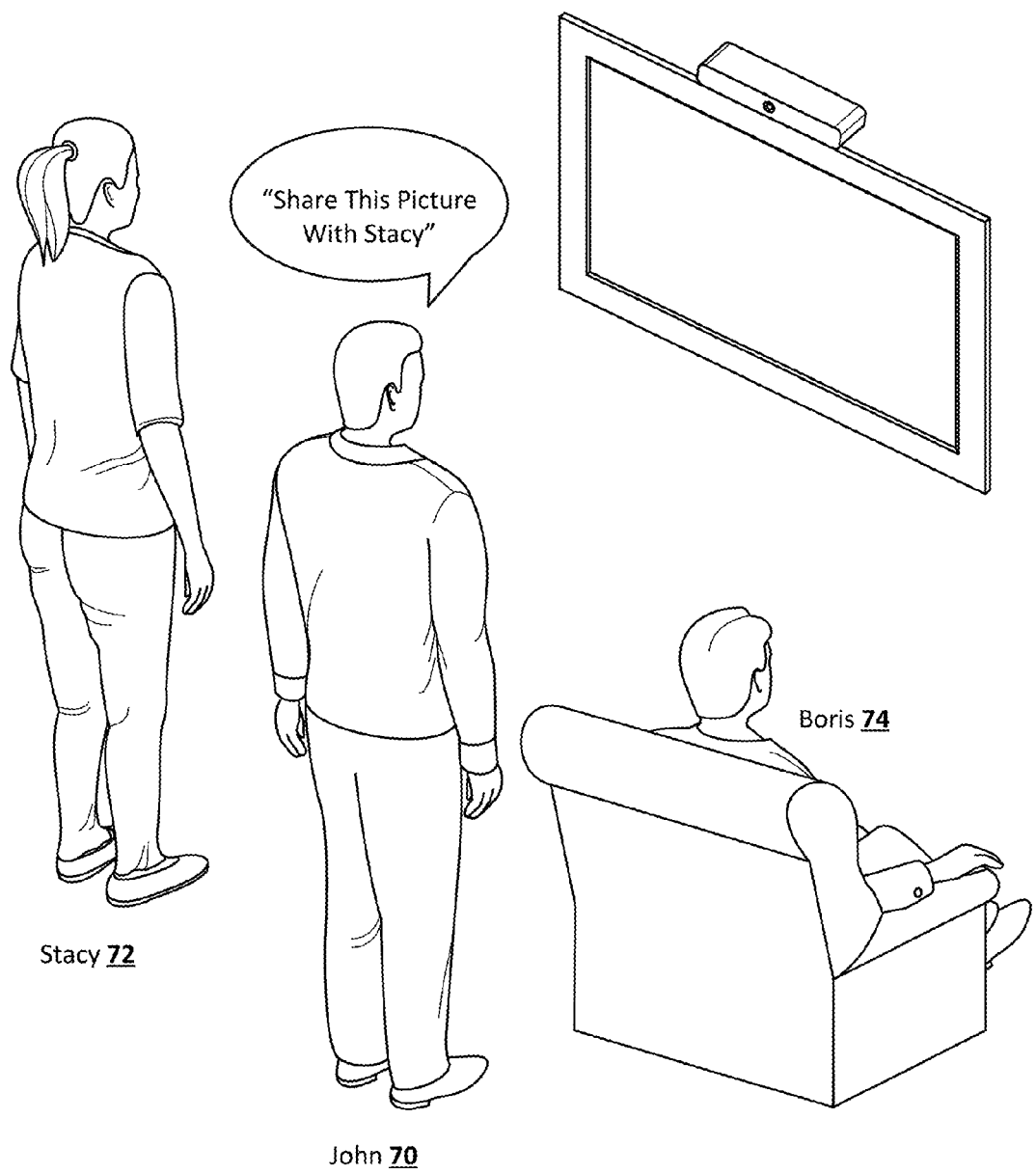
FIG. 9 shows an example of a user providing a speech command that may be disambiguated according to an implementation of the disclosed subject matter.

In another implementation, it may not be necessary for the user to perform a gesture. For example, the user may include a name in the speech command and the device may determine which of the users corresponds to the name. FIG. 9 shows an example of a user providing a speech command that may be disambiguated according to an implementation of the disclosed subject matter. As shown, John 70 may provide the speech command "share this picture with Stacy" without an accompanying gesture. In response, the device may determine which of the users in the field-of-view (or vicinity) corresponds to Stacy. In this case, the device may identity Stacy 72 after determining the identities of the other user in the field-of-view (e.g. Boris 74). In another example, John 70 may provide the speech command "share this picture with everyone," and in response, the device may share the picture to all other users within the field-of-view (or vicinity), which in this case would include Stacy 72 and Boris 74. Similar terms such as "everybody," "everything," "all," etc. may also be used.

In another example, the device may account for the number of users within the room. For example, in a situation where only John 70 and Stacy 72 are within a field-of-view, the device in response to John's command "forward this email to her," may deduct that "her" refers to Stacy since she is the only other user detected within the field-of-view. It should be noted that it may not be necessary for the user to remain within the field-of-view of the capture device when the device performs an action. For example, the device may remember if one or more users were within the field-of-view of the capture device in order to determine contextual information. For example, a speech command such as "share with everyone" may include users that may not be currently within the field-of-view, but may be within a vicinity (e.g. within the same room or venue). In addition, the field-of-view may include the field-of-views of multiple capture devices. For example, capture devices may be positioned in various rooms, and accordingly, the field-of-view may encompass these various rooms.

Returning to FIG. 4, in order to determine an identity of a user in 408, the device may perform a recognition function. The recognition function may include any suitable techniques such as facial recognition and/or voice recognition. When performing facial recognition, known techniques may be used including methods that recognize a face based on a shape, skin color, relative positioning of facial features, etc. When performing voice recognition, known techniques may be used such as determining whether a "voiceprint" or a template of the voice matches stored voice information associated with a user.

When identifying a user, it may be determined whether the identified user is associated with the device (e.g. a particular user may be associated with the device by logging in to user account), which may provide additional contextual information as described above. In an implementation, the device may determine one or more identities of one or more users in response to receiving the speech command. Accordingly, in such a situation, the recognition may be in response to the substance of the speech command. For example, the device may perform the recognition function in response to a potentially ambiguous speech command. Accordingly, in an implementation, the device may only perform the recognition function when necessary for disambiguation. When retrieving information related a recognition function, this information may be stored on the device or may be accessed from a remote source. For example, the device may communicate with a server (e.g. server 20) to retrieve identity information (e.g. user information such as name, preferences, etc.) when determining a user identity.

In 410, the device may disambiguate a portion of the received speech command based on the determined one or more identities. As described herein, disambiguating is defined broadly to include providing additional information and/or context to a word, and accordingly, may involve determining a precise (or more precise) meaning for one or more words in a speech input. For example, as described above, the device may disambiguate a subject (e.g. a personal pronoun), an object (e.g. a component in communication with the device), and/or other words of a speech command.

In 412, the device may perform an action based on the disambiguated speech command. In response to receiving a command, the device may perform (e.g. execute) various actions that may control the device. Particular "action" words may be predefined by a voice-based interface for the device. For example, action words may include, but are not limited to, words related to control of the device (e.g., turn on or off, louder, softer, increase, decrease, mute, output, clear, erase, brighten, darken, etc.), communications (e.g., e-mail, mail, call, contact, send, receive, get, post, tweet, text, etc.), document processing (e.g., open, load, close, edit, save, undo, replace, delete, insert, format, etc.), searches (e.g., find, search, look for, locate, etc.), content delivery (e.g., show, play, display), and/or other action words.

It should be noted that the examples of language interpretation described herein reference the English language, however these techniques may be used for other suitable languages. For example, this technique may be used for other languages that include potentially ambiguous nouns and/or pronouns. For instance, as described herein "my" may correspond to "mon" (masculine), or "ma" (feminine) in French.

In situations in which the implementations of the disclosed subject matter collect and/or use personal information about users (e.g. identity information), the system may provide users with the ability to control and/or set preferences related to the collection of such data. In addition, certain information may be treated in one or more ways before it is stored and/or used, so that personally identifiable information is removed. For example, a user may be provided with the option to remain anonymous or not be identified through a recognition function as described herein.

Various implementations may include or be embodied in the form of computer-implemented process and an apparatus for practicing that process. Implementations may also be embodied in the form of a computer-readable storage containing instructions embodied in a non-transitory and tangible storage and/or memory, wherein, when the instructions are loaded into and executed by a computer (or processor), the computer becomes an apparatus for practicing implementations of the disclosed subject matter.

The flow diagrams described herein are included as examples. There may be variations to these diagrams or the steps (or operations) described therein without departing from the implementations described herein. For instance, the steps may be performed in parallel, simultaneously, a differing order, or steps may be added, deleted, or modified. Similarly, the block diagrams described herein are included as examples. These configurations are not exhaustive of all the components and there may be variations to these diagrams. Other arrangements and components may be used without departing from the implementations described herein. For instance, components may be added, omitted, and may interact in various ways known to an ordinary person skilled in the art.

References to "one implementation," "an implementation," "an example implementation," and the like, indicate that the implementation described may include a particular feature, but every implementation may not necessarily include the feature. Moreover, such phrases are not necessarily referring to the same implementation. Further, when a particular feature is described in connection with an implementation, such feature may be included in other implementations whether or not explicitly described. The term "substantially" may be used herein in association with a claim recitation and may be interpreted as "as nearly as practicable," "within technical limitations," and the like. Terms such as first, second, etc. may be used herein to describe various elements, and these elements should not be limited by these terms. These terms may be used distinguish one element from another. For example, a first gesture may be termed a second gesture, and, similarly, a second gesture may be termed a first gesture.

The foregoing description, for purpose of explanation, has been described with reference to specific implementations. However, the illustrative discussions above are not intended to be exhaustive or to limit implementations of the disclosed subject matter to the precise forms disclosed. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A device for interpreting a voice-based input, the device operatively coupled to a camera that has a field-of-view, the device comprising:
a processor configured to:
detect a presence of (i) a first set of one or more people that are within a field-of-view of the camera, and (ii) a second set of one or more people that are outside the field-of-view of the camera and are within a predetermined distance from the camera;
receive a speech command;
detect a first touchless gesture performed by a particular person from among the first set of one or more people that are within the field-of-view of the camera and that are within the predetermined distance from the camera;
determine, based on detecting the first touchless gesture performed by the particular person, that the particular person is a source of the received speech command;
determine one or more identities of the second set of one or more people that are outside the field-of-view of the camera and that are within the predetermined distance from the camera;
disambiguate the received speech command based on the first touchless gesture and the determined one or more identities of the second set of one or more people that are outside the field-of-view of the camera and are within the predetermined distance from the camera; and
perform the disambiguated speech command.

2. The device of claim 1, wherein the disambiguated received speech command includes a personal pronoun.

3. The device of claim 2, wherein the disambiguated received speech command includes one of "he," "she," "him," "her," "his," "hers," "they," "them," "their," and "theirs".

4. The device of claim 1, wherein the disambiguated received speech command includes a name associated with one of the determined one or more identities of the second set of one or more people.

5. The device of claim 1, wherein the one or more identities of the second set of one or more people are determined in response to the received speech command.

6. The device of claim 5, wherein the first touchless gesture performed by the particular person includes a pointing gesture to a second person, and one of the one or more identities determined is an identity of the second person as a result of the first touchless gesture being determined to include the pointing gesture to the second person.

7. The device of claim 6, wherein the disambiguated received speech command includes a third-person personal pronoun.

8. The device of claim 1, wherein the processor is further configured to determine an identity of the particular person as a result of determining that the particular person is the source of the received speech command, and
wherein the disambiguated received speech command includes one of "I," "me," "my," "mine," "we" "us," "our," and "ours".

9. The device of claim 1, wherein the one or more identities of the second set of one or more people are determined in response to determining the presence of the second set of one or more people that are outside the field-of-view of the camera and within a predetermined distance from the camera.

10. The device of claim 9, wherein the first touchless gesture provides an indication to the device to commence the receiving of the speech command.

11. The device of claim 9, wherein the processor is further configured to detect a second touchless gesture performed by the particular person, and wherein the second touchless gesture provides an indication to the device that the speech command is complete.

12. The device of claim 1, wherein the first touchless gesture is performed contemporaneously with the speech command.

13. The device of claim 1, wherein the determined one or more identities of the second set of one or more people are based on performing a facial recognition.

14. The device of claim 1, wherein the camera includes a plurality of cameras.

15. The device of claim 1, wherein the device is operatively coupled to a plurality of microphones.

16. The device of claim 15, wherein the processor is further configured to adjust the plurality of microphones based on a relative position of the particular person as a result of determining that the particular person is the source of the received speech command.

17. A device for interpreting a voice-based input, the device operatively coupled to a camera that has a field-of-view, the device comprising:
a processor configured to:
determine one or more identities of (i) a first set of one or more people that are within a field-of-view of the camera and that are within a predetermined distance from the camera, and (ii) a second set of one or more people that are outside the field-of-view of the camera and that are within the predetermined distance from the camera;
receive a speech command from a particular person among the first set of one or more people that are within the field-of-view of the camera and that are within the predetermined distance from the camera;
disambiguate the received speech command based on the determined one or more identities of the second set of one or more people that are outside the field-of-view of the camera and that are within the predetermined distance from the camera; and
perform the disambiguated speech command.

18. The device of claim 17, wherein the disambiguated received speech command includes a personal pronoun.

19. The device of claim 18, wherein the personal pronoun is one of "he," "she," "him," "her," "his," "hers," "they," and "them," "their," and "theirs".

20. The device of claim 17, wherein the disambiguated received speech command includes a name associated with one of the determined one or more identities of the second set of one or more people.

21. The device of claim 17, wherein the processor is further configured to determine that the particular person is a source of the received speech command based on detecting a first touchless gesture performed by the particular person.

22. The device of claim 17, wherein the one or more identities of the second set of one or more people are determined in response to receiving the speech command.

23. A computer-implemented method for a device to interpret a voice-based input, the device operatively coupled to a camera that has a field-of-view, the method comprising:
detecting a presence of (i) a first set of one or more people that are within a field-of-view of the camera and that are within a predetermined distance from the camera, and (ii) a second set of one or more people that are outside the field-of-view of the camera and that are within the predetermined distance from the camera;
receiving a speech command;
detecting a first touchless gesture performed by a particular person from among the first set of one or more people that are within the field-of-view of the camera and that are within the predetermined distance from the camera;
determining, based on detecting the first touchless gesture performed by the particular person, that the particular person is a source of the received speech command;
determining one or more identities of the second set of one or more people that are outside the field-of-view of the camera and that are within the predetermined distance from the camera;
disambiguate the received speech command based on the determined one or more identities of the second set of one or more people that are outside the field-of-view of the camera and that are within the predetermined distance from the camera; and
performing, by the device, the disambiguated speech command.

24. The method of claim 23, wherein the disambiguated received speech command includes a personal pronoun.

25. The method of claim 24, wherein the disambiguated received speech command includes one of "he," "she," "him," "her," "his," "hers," "they," "them," "their," and "theirs".

26. The method of claim 23, wherein the disambiguated received speech command includes a name associated with one of the determined one or more identities of second set of one or more people.

27. The method of claim 23, wherein the one or more identities of the second set of one or more people are determined in response to the received speech command.

28. The method of claim 27, wherein the first touchless gesture performed by the particular person includes a pointing gesture to a second person, and one of the one or more identities determined is an identity of the second person as a result of the first touchless gesture being determined to include the pointing gesture to the second person.

29. The method of claim 28, wherein the disambiguated received speech command includes a third-person personal pronoun.

30. The method of claim 23, wherein the processor is further configured to determine an identity of the particular person as a result of determining that the particular person is the source of the received speech command, and
wherein the disambiguated received speech command includes one of "I," "me," "my," "mine," "we" "us," "our," and "ours".

31. The method of claim 23, wherein the one or more identities of the second set of one or more people are determined in response to determining the presence of the second set of one or more people that are outside the field-of-view of the camera and within a predetermined distance from the camera.

32. The method of claim 31, wherein the first touchless gesture provides an indication to the device to commence the receiving of the speech command.

33. The method of claim 31, further comprising detecting a second touchless gesture performed by the particular person, wherein the second touchless gesture provides an indication to the device that the speech command is complete.

34. The method of claim 23, wherein the first touchless gesture is performed contemporaneously with the speech command.

35. The method of claim 23, wherein the determined one or more identities of the second set of one or more people are based on performing a facial recognition.

36. The method of claim 23, wherein the camera includes a plurality of cameras.

37. The method of claim 23, wherein the device is operatively coupled to a plurality of microphones.

38. The method of claim 37, further comprising adjusting the plurality of microphones based on a relative position of the particular person as a result of determining that the particular person is the source of the received speech command.

* * * * *